2,844,438

METHOD OF PRODUCING POTASSIUM AND AMMONIUM ALUMS

Herbert H. Peckham, New Castle, and Stewart L. Harris II, Claymont, Del., assignors to Allied Chemical & Dye Corporation, New York, N. Y., a corporation of New York No Drawing. Application March 29, 1956
Serial No. 574,619

10 Claims. (Cl. 23—118)

The present invention relates to potassium and ammonium alums and their preparation.

Potassium alum, $K_2SO_4 \cdot Al_2(SO_4)_3 \cdot 24H_2O$, and ammonium alum, $(NH_4)_2SO_4 \cdot Al_2(SO_4)_3 \cdot 24H_2O$, are well known products which are desirably prepared for marketing and use in the form of lumps or large crystals. The lump grades of these alumns have heretofore been typically prepared by mixing aluminum sulfate solution with approximately an equimolar amount of either ammonium or potassium sulfate and crystallizing the mixture, preferably after its treatment with a suitable reducing agent and filtration to remove suspended materials. The crystals remaining after drawing off mother liquor have been melted and, permissibly after further chemical purification, poured into block crystallizers which are tanks formed of assembled wall or shell segments adapted to be disassembled by removal of the segments. Within the tanks the potassium or ammonium alum liquor has been cooled slowly until the bulk of the liquor has solidified into a solid block. After withdrawal of remaining mother liquor, if any, the tanks have been disassembled and the block material broken by pick-axes, sledges and ordinarily also crushing and screening to produce lump product of desired average size. Close specifications as to lump size often required hand picking of the lumps from a mass of larger and smaller sized material. The entire procedure is lengthy, requires much labor and handling, and consequently is undesirably costly. Fines resulting from this breaking procedure have been reused by incorporating them with fresh liquor prior to pouring of the same into another block crystallizer.

The block or lump crystal ammonium and potassium alums resulting from the prior process have been subject to several disadvantages. Their water content, nearly equal to their content of salt, makes shipping costs high in terms of salt content. The generally rough configuration and non-uniformity of size of the individual lumps have created problems in connection with the packaging of them, the solution of which has involved incurring appreciable expense. These characteristics also resulted in relatively low bulk density of packaged product and in correspondingly high requirements for shipping and storage space.

Many attempts have been made to produce uniformly sized and shaped ammonium and potassium alum products. Such methods included melting the crystalline material and casting it in molds of desired size and shape. The cast product, however, was invariably unstable upon being subjected to normal shipping, storage, and other handling conditions. Upon exposure to atmosphere of even relatively low moisture content, the cast material decrepitated rapidly to smaller pieces and forms. A few days or less contact with atmosphere of relatively high humidities or below precipitation temperature, resulted in complete loss of identity of the material as a product of uniform size and shape. Such recast alums could not meet the specifications for lump grades of alum.

It is an object of this invention to provide in block form an ammonium or potassium alum characterized by high stability to deterioration upon exposure to the atmosphere, and by low water content. A further object is to provide a strong, dense, block of uniform size and regular shape, which is substantially non-porous and has desirable solubility characteristics. Other objects will be apparent from the following description.

In making the novel products of the invention an aqueous solution of substantially equimolar proportions of aluminum sulfate and of a salt selected from the group consisting of potassium sulfate and ammonium sulfate containing at least 12, but preferably not over 30, mols of water for each mol of one of said sulfates is heated to boiling point, and if the sulfate contains more than 14 mols of water, is subjected to evaporation until its water content is reduced to 12 to 14, preferably 13, mols per mol of either sulfate. The hot boiling solution is then poured into containers or molds of desired size and shape and therein cooled until solidified.

The cooled cast product, upon removal from the mold, is a dense alum of white, opaque appearance which, upon standing for many months exposed to high humidity atmosphere at temperature above dew point, retains its size and shape without cracking or chipping. Even when subjected to moist atmosphere at temperature approaching or approximating dew point, the block crystals are remarkably stable, exhibiting only slow tendency to flower at the edges. Upon being dissolved in water the product exhibits solution rates which, in terms of salt dissolved, are superior to the rates of solution of the prior art lump crystals. Additionally, the cast crystal withstands more severe handling without breakage than does the prior art product.

It has been discovered that the desired products and the novel product are not attained unless the product contains 12–14 mols of water of crystallization. Evaporation of the solution of the sulfates to a lower water content results in formation of precipitate and solid solution incapable of crystallization and casting to a true alum product, and in failure to attain the desired solubility characteristics. Blocks obtained by casting and cooling hot solution of higher water content crack rapidly, typically within a few days, upon being exposed to ambient atmosphere and rapidly deteriorate into forms failing to exhibit the desired solubility and other characteristics of block crystal alums.

In producing the liquor of desired water content, the starting solution may simply be formed or placed in an open evaporator and heated until boiling at temperature which, for potassium alum, is within the range of 237.5° F. to 241° F., preferably about 239° F., or for ammonium alum within the range of 243° F. to 247° F., preferably about 245° F. Upon initial heating the temperature of the solution increases until it begins boiling at lower temperature than those indicated above and while continuing to boil and evaporate the temperature increases. When the boiling temperature reaches a selected level within the above ranges, the hot liquor is poured into pans or molds of suitable shape and size disposed, for example, on a moving belt or chain conveyor, and are then cooled until solidified. The cooling may be at the slow rate achieved by simply allowing the pans to lose heat by radiation to ambient atmosphere or at an accelerated rate obtained, for example, by passing a stream of cold air over the sides and bottoms or by immersing the pans in or passing them through cooling liquor such as water.

Evaporator operation may be either batch or continuous. If the latter, a continuous stream of feed solution may be admitted to an open heated pot, the contents of which are maintained at selected temperature within the above indicated ranges, the pot in turn overflowing continuously into the feeding station of a pan conveyor. In the interest of maintaining constant temperature conditions within the evaporator, it is preferred to agitate the same with a suitable efficient mechanical agitator to supplement the agitation induced by boiling.

It will be understood that the invention does not require highly purified sulfate starting materials. However, for most uses of the product, for example to treat water, it is preferred to employ starting sulfates which have been suitably purified by any known or desired method to remove heavy metal and other impurities which they contain as the result of their preparation and subsequent handling. In the event purified sulfates are not readily available or extensive purification of them is costly, a convenient method of supplying sulfate solution of high purity is to prepare crystalline potassium or ammonium alum employing any desired sequence of chemical treating and crystalline procedures which effect purification to the desired extent. Purified crystal so obtained may then be used as such as charge to the evaporator wherein it first dissolves in its own water of crystallization and thereafter boils at progressively increasing temperature until the desired composition of 12–14 mols of water for each mol of either sulfate is obtained.

*Example 1.*—A nearly saturated solution of substantially equimolar proportions of aluminum sulfate and potassium sulfate was prepared, was treated with aluminum powder to reduce ferric iron to ferrous condition and filtered while hot and the filtrate poured in the shallow lead pans and therein allowed to cool and crystallize. 750 grams of 24 water crystals remaining after drawing off the mother liquor were charged to an open evaporator vessel, heated by steam passing through an external heating jacket, and equipped with an agitator. As they became heated, the crystals of potassium alum melted and dissolved in their water of crystallization at about 198° F. and thereafter the solution reached boiling point. The boiling was continued until a thermocouple immersed in the agitated solution indicated temperature of 239.2° F. The hot solution was then poured into pans of approximately 3 inches in length, 3 inches in depth, and 3 inches in width and therein cooled until a solid block of opaque, white appearance was formed. The blocks had density of about 1.98 and upon being stored for 18 months in atmospheres of controlled humidity ranging from 30% to 93% relative humidity, remained substantially unchanged in physical form and weight and exhibited no tendency toward cracking, chipping at the edges, spalling, or other forms of decrepitation. At the end of this period they retained a lustrous appearance which they had upon first being made.

Analysis of the blocks indicated their composition to be $K_2SO_4 \cdot Al_2(SO_4)_3 \cdot 13H_2O$. Upon being dissolved in water at 75° F., they were completely dissolved going into solution at an average rate of 0.154 gram per minute. This rate compares with an average rate of solution of 0.190 gram per minute exhibited under identical conditions by lump or block potassium alum crystal of comparable size prepared by conventional procedure and containing, as is typical of the conventional product, 24 mols of water for each mol of either sulfate. In terms of sulfate content the product of the invention dissolved at the rate of .106 gram of total sulfate per minute and the prior art product at the rate of .103 gram of total sulfate per minute.

*Example 2.*—An ammonium alum crystal prepared from substantially equimolar proportions of aluminum sulfate and ammonium sulfate was made by substantially the procedure outlined in Example 1 for potassium alum crystal. 750 grams of the ammonium alum crystal were charged to the same evaporator and therein boiled until boiling point reached 245° F., whereupon the hot solution was poured into pans similar to those employed for potassium alum. Upon examination and analysis of the cooled material they were found to have solubility rate in water of about 0.259 gram per minute. The cast blocks, which were lustrous white when first prepared, retained their appearance, and exhibited the same superior stability as the potassium alum blocks when exposed to ambient atmosphere in the same manner over the same period. For purposes of comparison, block crystal ammonium alum prepared by conventional procedure and containing 24 molecules of water per molecule of either sulfate, the blocks being of comparable size, exhibited solution rate of 0.205 gram per minute. The cast crystal block of the invention had a composition of $$(NH_4)_2SO_4 \cdot Al_2(SO_4)_3 \cdot 13H_2O$$

On an anhydrous basis, the product of this example and the conventional product dissolved at average rates of 173 and 107 grams per minute, respectively.

The superior characteristics of the products of the invention are retained over a wide range of sizes and shapes of the cast crystal except for such differences, for example, as rates of solubility which might be expected to differ in accordance with differences in area of total block subjected to solution test with respect to weight of the block. By way of illustration only, blocks may be produced in accordance with the invention designed to satisfy varied needs in use which are essentially cubical, hemispherical, pyramidal, or any other desired shape having major dimensions within the range of ½″ to 5 or 6 inches.

Although certain aspects of the invention have been set forth in detail in the foregoing description, it will be apparent to those skilled in the art that various modifications thereof may be made which fall within the scope of the appended claims.

The invention claimed is:

1. The process of making molded blocks of an alum selected from the group consisting of potassium alum and ammonium alum comprising forming a boiling solution in water containing substantially equimolar proportions of aluminum sulfate and a salt of the group consisting of potassium sulfate and ammonium sulfate and 12 to 14 mols of water for each mol of one of said sulfates, flowing the boiling solution into molds and cooling the mold contents and substantially solid.

2. The process of making molded block potassium alum comprising forming a boiling solution in water containing substantially equimolar proportions of aluminum sulfate and potassium sulfate and 12 to 14 mols of water for each mol of one of said sulfates, flowing the boiling solution into molds and cooling the mold contents until substantially solid.

3. The process of making molded block ammonium alum comprising forming a boiling solution in water containing substantially equimolar proportions of aluminum sulfate and ammonium sulfate and 12 to 14 mols of water for each mol of one of said sulfates, flowing the boiling solution into molds and cooling the mold contents until substantially solid.

4. The process of making a molded block alum selected from the group consisting of potassium alum and ammonium alum comprising forming a solution in water containing substantially equimolar proportions of aluminum sulfate and a sulfate selected from the group consisting of potassium sulfate and ammonium sulfate and at least 15 mols of water for each mol of one of said sulfates, boiling said solution until the water content thereof is reduced to 12–14 mols on the aforesaid basis, pouring the said evaporated solution while hot into molds, and cooling the mold contents until substantially solid.

5. The process of making a molded block alum selected from the group consisting of potassium alum and ammonium alum comprising forming a solution in water containing substantially equimolar proportions of aluminum sulfate and a sulfate selected from the group consisting of potassium sulfate and ammonium sulfate and at least 15 mols but not in excess of about 30 mols of water for each mol of one of said sulfates, boiling said solution until the water content thereof is reduced to 12–14 mols on the aforesaid basis, pouring the said evaporated solution while hot into molds, and cooling the mold contents until substantially solid.

6. The process of making molded blocks of an alum selected from the group consisting of ammonium alum and potassium alum comprising heating starting alum containing 24 mols of water of crystallization to melt the same, boiling the resulting alum solution until it contains 12–14 mols of water for each mol of aluminum sulfate contained therein, flowing the boiling solution into molds, and cooling the mold contents until substantially solid.

7. The process of making molded blocks of potassium alum comprising forming a boiling solution in water of substantially equimolar proportions of potassium sulfate and aluminum sulfate which has a boiling point within the range of 237.5° F. to 241° F., flowing the solution while boiling into molds, and cooling the mold contents until substantially solid.

8. The process of making molded blocks of ammonium alum comprising forming a boiling solution in water of substantially equimolar proportions of ammonium sulfate and aluminum sulfate which has a boiling point within the range of 243° F. to 247° F., flowing the solution while boiling into molds, and cooling the mold contents until substantially solid.

9. The process of making molded blocks of potassium alum comprising forming a boiling solution in water of substantially equimolar proportions of potassium sulfate and aluminum sulfate which has a boiling point of about 239° F., flowing the solution while boiling into molds, and cooling the mold contents until substantially solid.

10. The process of making molded blocks of ammonium alum comprising forming a boiling solution in water of substantially equimolar proportions of ammonium sulfate and aluminum sulfate which has a boiling point within the range of about 245° F., flowing the solution while boiling into molds, and cooling the mold contents until substantially solid.

References Cited in the file of this patent

UNITED STATES PATENTS 2,214,214      Walthall _____ Sept. 10, 1940

OTHER REFERENCES

Mellor: "Comprehensive Treatise on Inorganic and Theoretical Chemistry," vol. 5, 1924, Longmans, Green & Co., New York, New York, page 347.

Hoffmann: "Lexikon der Anorganischen Verbindungen," Band 2, Al–X, No. 56–81, Bibliographien, Verlag von Johann Ambrosius Barth, Leipzig, 1912–1914, page 37.

UNITED STATES PATENT OFFICE
CERTIFICATE OF CORRECTION

Patent No. 2,844,438                          July 22, 1958

Herbert H. Peckham et al.

It is hereby certified that error appears in the printed specification of the above numbered patent requiring correction and that the said Letters Patent should read as corrected below.

Column 4, line 45, for "contents and" read -- contents until --.

Signed and sealed this 10th day of March 1959.

(SEAL)
Attest:

KARL H. AXLINE
Attesting Officer

ROBERT C. WATSON
Commissioner of Patents